United States Patent Office 3,046,808
Patented July 31, 1962

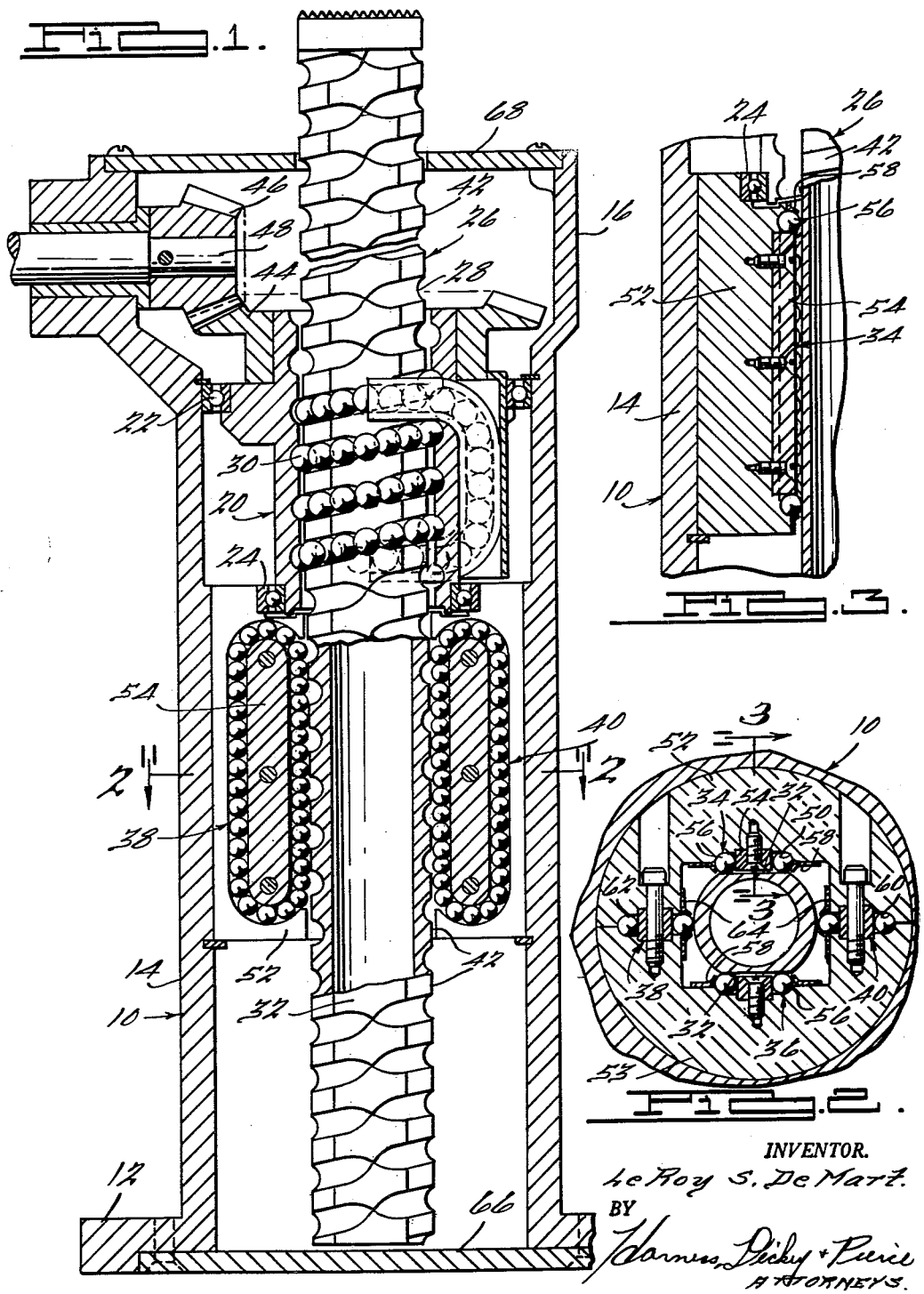

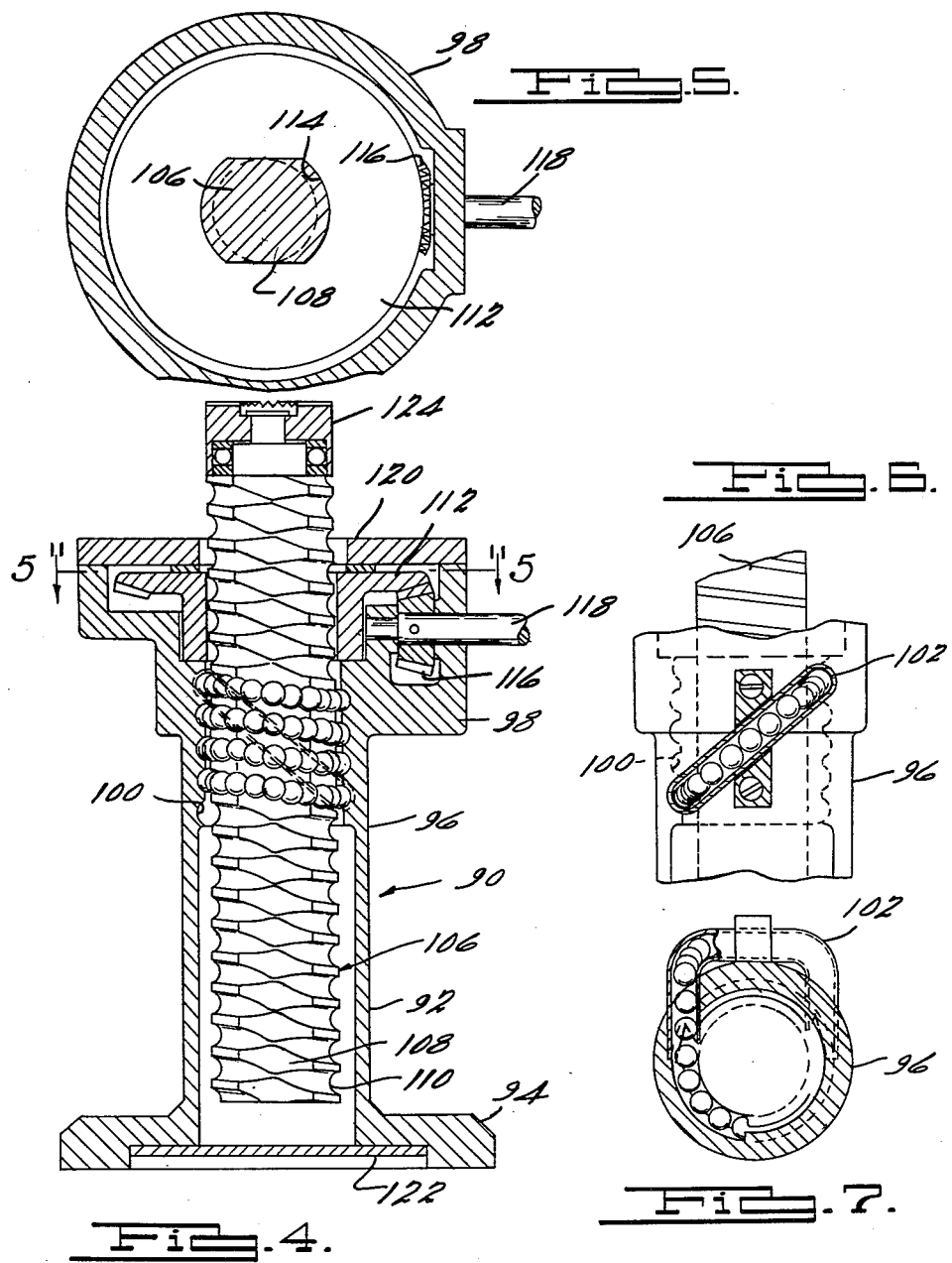

3,046,808
TRANSLATIONAL DRIVE MECHANISM
Le Roy S. De Mart, 105 Woodland Heights,
Lancaster, Ohio
Filed Mar. 6, 1959, Ser. No. 797,677
16 Claims. (Cl. 74—424.8)

This application is a continuation-in-part of my copending application Serial No. 606,726, filed August 28, 1956, now Patent No. 2,885,711.

This invention relates to an improved translational drive mechanism, and more particularly to improved ball nut and screw type supporting and drive arrangements.

One important object of the present invention is to provide an improved arrangement for positive angular engagement between a ball nut screw and a member axially movable relative thereto, whereby scoring and wear of the balls of the ball nut are minimized and the smoothness of drive is enhanced.

Other objects are: to provide an improved arrangement for supporting and guiding a screw member for longitudinal travel with a minimum of frictional resistance; to provide an antifriction support for a screw shaft including antifriction elements arranged to engage axially extending portions of the surface of the screw; to provide improved antifriction means for positive angular engagement between a screw and a member that is movable longitudinally relative to the screw, thereby minimizing frictional resistance to movement of the screw; to provide improved supporting and engaging means of this character in a ball nut and screw drive mechanism, the screw being provided with one or more flats for angular engagement with a member and having no sharp angular surface intersecting the ball track which might score or otherwise injure the balls of the ball nut and interfere with smooth operation, particularly under heavy load conditions; to provide an improved screw support and drive mechanism in which all contact with the screw is made through antifriction elements, thus minimizing the internal frictional resistance of the mechanism; and in general, to provide an improved screw drive and guiding arrangement which is of relatively simple and rugged construction, and has exceptionally smooth, easy, and long wearing operating characteristics.

The foregoing and other objects and advantages of the invention will become apparent in the following detailed description of representative embodiments thereof taken in conjunction with the drawings wherein:

FIGURE 1 is a cross-sectional view of a lift jack representing a preferred embodiment of the present invention;

FIG. 2 is a horizontal sectional view of the jack shown in FIG. 1, taken along the section line 2—2 thereof;

FIG. 3 is a fragmentary cross-sectional view taken along the lines 3—3 of FIG. 2;

FIG. 4 is a cross-sectional view of a lift jack according to a modified form of the invention;

FIG. 5 is a cross-sectional view of the jack shown in FIG. 4, taken along the section line 5—5 thereof;

FIG. 6 is a fragmentary elevational view, partly in section, of the jack shown in FIG. 4, particularly showing certain details of the driving mechanism thereof; and FIG. 7 is a fragmentary horizontal sectional view of the jack shown in FIG. 4.

Ball nut and screw drive mechanisms have heretofore been provided with keyways for engagement by a member that is axially movable along the screw, or through which the screw moves in translation without turning. It has been found that the keyways tend to increase the wear of the balls of the ball nut, and to affect the smoothness of drive, particularly in instances where a relatively heavy load is imposed in an axial direction between the screw and the ball nut.

According to one aspect of the present invention, the service life of the balls is increased, and the smoothness of drive improved by having the member engage the screw through flats formed on the screw shaft. The flats provide a relatively gradual and smooth transition path for the circulating balls so that after passing over the flats the balls reenter the screw groove gradually and smoothly, and do not encounter sharp or abrupt edges as they do when a keyway is employed. By the provision of flats on the screw, cutting or spalling of the circulating balls is materially reduced and a smoother action is achieved.

Other features of the invention relate to the mounting of freely rotatable antifriction elements such as balls between the members and the screw to minimize frictional resistance to relative movement between the member and the screw, and to the provision of supplemental antifriction elements for engaging the crest portions of the screw and thereby providing full lateral support for the screw with a minimum of friction.

Referring now to the drawings, with particular reference to FIGS. 1–3, the invention is illustrated therein as embodied in a lift jack capable of smoothly and efficiently lifting relatively heavy loads with a minimum of frictional resistance. The jack comprises a generally cylindrical housing 10 having an outturned base flange 12, a central cylindrical portion 14, and an upper enlarged portion 16. A recirculating type ball nut 20 is rotatably mounted within the central portion 14 upon upper and lower ball bearings 22 and 24, respectively, and a screw 26 having a thread 28 of generally semicircular sectional shape for receiving the balls 30 extends through the ball nut 20 and provides the mating half of the ball raceway (not separately designated).

Flats 32 are formed on opposite sides of the screw 26 approximately to but not deeper than the depth of the screw thread 28. The flats 32 are engaged by a pair of circulating ball sets 34 and 36, which are housed in the central portion 14 of the housing immediately below the ball nut 20, and which hold the screw 26 against rotation relative to the housing 10. Auxiliary sets 38 and 40 of circulating balls are mounted in the housing for engaging the crests 42 of the screw thread at positions angularly spaced from the flats 32—32, thereby relieving the ball nut 20 of lateral forces and keeping the screw 26 firmly and smoothly aligned in the housing 10.

A crown, or bevel gear 44 is fixed to the ball nut 20 at the top thereof, and is in mesh with a pinion 46, which is mounted on a shaft 48 journaled in the wall of the upper portion 16 of the housing.

In operation, a hand crank or other rotating device (not shown) is fitted on the outer end of the shaft 48 for turning it. The shaft 48 turns the pinion 46, which turns the gear 44, thus turning the ball nut 20 to drive the screw 26 either up or down depending on the direction of rotation, while the circulating ball assemblies 34, 36, 38, and 40 hold the screw 26 against rotation and in fixed alignment with the housing 10 and the ball nut 20.

Each one of the ball sets 34 and 36 includes an oval raceway 50 arranged generally parallel and close to and opening toward one of the flats 32. Each one of the raceways 50 may be formed by a single oval recess formed in the semicylindrical mounting 52 or 53 and similar in shape to raceways 38 and 40 shown in FIG. 1, the inner wall of each raceway being formed by an oval filler piece, as 54, in the preferred construction shown. The balls 56 are retained in the raceway 50 by retainer strips 58 which are rigidly secured to the mounting members 52 and 53 and extend partly over the balls 56, leaving the radially inwardly facing portions of the balls exposed for direct contact with the screw flats 32.

Block sections 52, 53 in which the raceways are formed are secured together by screws 57 which also retain the filler pieces 54 for raceways 38, 40, blocks 52, 53 being fast in the casing 10 so that the ball sets 34 and 36 may key the screwshaft against rotation.

In the absence of torque applied between the screw 26 and the ball sets 34 and 36, balls on both sides of the ball sets contact the flats 32 and support the screw 26 against lateral displacement. The arrangement, however, provides for free and unimpeded circulation of the balls during movement of the screw. In operation, when the screw 26 is placed under torque, the resulting angular load placed on the ball sets 34 and 36 is imposed only on one side, that is, on one vertical row of each of these sets 34 and 36, leaving the opposite row free of pressure and thus permitting free circulation of the balls 56.

The auxiliary ball sets 38 and 40 are of generally similar construction to the ball sets 34 and 36 that engage the screw flats, except that their raceways 60 are arranged in planes that include the screw axis so that only a single row of balls in each one of the auxiliary sets 38 and 40 contacts the screw. The opposite row in each set constitutes a return track. The balls 62 in the auxiliary sets are retained in their raceways 60 by retainer strips 64, which are arranged to leave inwardly facing portions of the balls exposed for engagement with the crests 42 of the screw. Retainers 58 similarly prevent balls 56 from moving outwardly into the screw race portions between the flat sections engaged by the balls.

The screw 26 is entirely supported upon antifriction elements which roll freely when the screw moves relative to the housing 10, thus minimizing the internal frictional resistance of the jack, while still providing positive, smooth, and accurately guided support for the screw.

Protective closure members 66 and 68 are preferably provided at the top and the bottom of the housing 10, respectively, to keep out dust, dirt and moisture which might otherwise score or corrode the balls or their raceways.

Another jack 88 according to a modified form of the invention is illustrated in FIGS. 4-7 and differs from the jack shown in FIGS. 1-3 in that the screw 106 is rotated relative to the housing 90 while the ball nut is angularly fixed relative thereto. The jack 88 is raised and lowered by rotating the screw instead of by rotating the ball nut.

The jack 88 comprises a generally cylindrical housing 90 having an outturned base flange 94, a central cylindrical portion 96 and an upper cup-like extension 98. An internal ball nut raceway 100 and a ball return track 102 are formed in the cylindrical portion 96 so that this portion 96 may be regarded as a circulating type ball nut having an extended casing. It will be appreciated, of course, that generally similar results in a less compact structure may be obtained by enclosing a conventional circulating ball nut within an appropriately shaped housing, but the illustrated structure is preferred because of its compactness and relatively light weight.

A screw 106 having a thread 107 of generally semi-circular sectional shape for receiving the balls 109 is fitted within the housing 90 and provides the mating half of the ball raceway (not separately designated). Flats 108 are formed on opposite sides of the screw 106 approximately to but not deeper than the depth of the screw thread 110. The flats 108 are engaged by a bevel gear 112, which is housed in the upper portion 98 of the housing, and which has a central aperture 114 shaped to conform to the flats 108. The screw 106 is thus angularly fixed to the bevel gear 112 for rotational drive thereby, and is slidable lengthwise through the bevel gear.

The bevel gear 112 is drivingly engaged by a tapered pinion 116, which is mounted on a short shaft 118 journaled in the cup-shaped portion 98 of the housing. The pinion 116 may be actuated by any desired means such as, for example, a hand crank (not shown) connected to the shaft 118. The housing 90 may be provided, as illustrated, with an upper retaining cover 120 for holding the bevel gear 112 in engagement with the pinion 116, and a bottom dust cover 122 to rotate the screw 106 and the ball raceway from dirt and moisture.

A lifting cap, or shoe 124, which may be of the ball bearing type as shown is mounted at the upper end of the screw 106 for engaging an object to be lifted and permitting the screw 106 to be rotated while the shoe 124 remains relatively fixed.

In operation, the shaft 118 is rotated to turn the pinion 116, which rotates the bevel gear 112 to turn the screw 106. Depending upon the direction of rotation, the screw 106 then travels up or down within the housing 90. The highly efficient friction reducing characteristics of the circulating ball drive are maintained for long service life even though heavy loads are applied to the jack, because the balls are effectively safeguarded against damage through the elimination of sharp angular surfaces intersecting the ball track, or raceway. The flats 108 on the screw intersect the helical round-bottomed screw thread 107 at relatively large obtuse angles at all positions of meeting, so that the meeting surfaces do not constitute sharp edges, as would be the case if a conventional keyway were used having sides parallel to a radius of the screw. It will be understood that with no axial loading of the shaft a simple keyway, shallower than the screw thread would theoretically be equivalent to the flats 108. Under operating conditions, however, an axial load is applied between the screw and the ball nut, so that the balls tend to roll against, and are compressed between the lower surfaces of the nut thread and the upper surfaces of the screw thread. The obtuse angles at which the flats 108 intersect the ball track are probably best illustrated in FIG. 5, in connection with which it should be noted that if a conventional keyway were employed, the parallel sides of the keyway would intersect the ball track at relatively acute angles and would tend, under relative axial loading of the screw and the nut, to injure the balls.

When the balls are under load and encounter a keyway, they lose support, and due to their natural yieldability and elasticity, protrude slightly into the keyway. As they pass across the keyway, they again encounter support and must be forced back completely into the screw thread. In doing this on a screw having a slot-type keyway, the balls must roll over the relatively sharp corner defined by the wall of the screw thread and the side wall of the slot. This corner is sharper than any edge encountered by the balls in the arrangement of the present invention, wherein the angle between the flat and the wall of the thread is everywhere obtuse and relatively blunt, thus minimizing the cutting or mutilating effect upon the balls and permitting the balls to ride up slowly and gradually upon the thread wall.

The corner formed by the side wall of the slot and the screw thread in the slot-type keyway arrangement of the prior art not only tends to damage the balls as they pass it, but also will cause a jumping action due to its sharpness and due to the small travel of the balls in riding up over it, whereas with the flats the balls are only gradually forced back to their fully loaded positions in the thread, resulting in smoother operation. By the provision of the flats 108, the wear on the balls is substantially reduced, there is less danger of scoring or otherwise mutilating the balls, and the action and travel of the screw in the ball nut is smoother.

What is claimed is:

1. A translational drive mechanism comprising recirculating ball-type screw and nut portions, said screw and nut portions having opposed coacting concave helical thread-defining raceways thereupon, a recirculating ball set comprising balls bridging the space between and projecting into both of said opposed raceways to journal the screw and nut portions while transmitting force axially therebetween, the screw portion having peak peripheral parts between convolutions of its helical raceway and lying on a cylindrical surface, said screw portion also having a longitudinal extending flat thereon intersecting said cylindrical surface and extending to a depth which does not exceed the depth of the raceway of the screw portion, rotation controlling means engaged with said flat and held by said flat against relative rotation with respect to the screw portion about the axis of the screw portion while permitting relative movement in an axial direction, and means for producing relative rotation between said screw and nut portions to drive one of said portions longitudinally with respect to the other.

2. A translational drive mechanism comprising recirculating ball-type screw and nut portions, said screw and nut portions having opposed coacting concave helical thread-defining raceways thereupon, a recirculating ball set comprising balls bridging the space between and projecting into both of said opposed raceways to journal the screw and nut portions while transmitting force axially therebetween, the screw portion having peak peripheral parts between convolutions of its helical raceway and lying on a cylindrical surface, said screw portion also having a pair of longitudinally extending flats thereon intersecting said cylindrical surface and extending to a depth which does not exceed the depth of the raceway of the screw portion, rotation controlling means engaged with said flats and held by said flats against relative rotation with respect to the screw portion about the axis of the screw portion while permitting relative movement in an axial direction, and means for producing relative rotation between said screw and nut portions to drive one of said portions longitudinally with respect to the other.

3. A translational drive mechanism comprising recirculating ball-type screw and nut portions, said screw and nut portions having opposed coacting concave helical thread-defining raceways thereupon, a recirculating ball set comprising balls bridging the space between and projecting into both of said opposed raceways to journal the screw and nut portions while transmitting force axially therebetween, the screw portion having peak peripheral parts between convolutions of its helical raceway and lying on a cylindrical surface, said screw portion also having a pair of longitudinally extending flats thereon intersecting said cylindrical surface and extending to a depth which does not exceed the depth of the raceway of the screw portion, rotation controlling means engaged with said flats and held by said flats against relative rotation with respect to the screw portion about the axis of the screw portion while permitting relative movement in an axial direction, means for producing relative rotation between said screw and nut portions to drive one of said portions longitudinally with respect to the other, said rotation controlling means also including antifriction elements engaging said flats.

4. A translational drive mechanism comprising recirculating ball-type screw and nut portions, said screw and nut portions having opposed coacting concave helical thread-defining raceways thereupon, a recirculating ball set comprising balls bridging the space between and projecting into both of said opposed raceways to journal the screw and nut portions while transmitting force axially therebetween, the screw portion having peak peripheral parts between convolutions of its helical raceway and lying on a cylindrical surface, said screw portion also having a pair of longitudinally extending flats thereon intersecting said cylindrical surface and extending to a depth which does not exceed the depth of the raceway of the screw portion, rotation controlling means engaged with said flats and held by said flats against relative rotation with respect to the screw portion about the axis of the screw portion while permitting relative movement in an axial direction, means for producing relative rotation between said screw and nut portions to drive one of said screw portions longitudinally with respect to the other, said rotation controlling means including endless keying ball raceways facing said flats, and balls rotatably disposed in said keying ball raceways.

5. A translational drive mechanism comprising recirculating ball-type screw and nut portions, said screw and nut portions having opposed coacting concave helical thread-defining raceways thereupon, a recirculating ball set comprising balls bridging the space between and projecting into both of said opposed raceways to journal the screw and nut portions while transmitting force axially therebetween, the screw portion having peak peripheral parts between convolutions of its helical raceway and lying on a cylindrical surface, said screw portion also having a pair of longitudinally extending flats thereon intersecting said cylindrical surface and extending to a depth which does not exceed the depth of the raceway of the screw portion, rotation controlling means engaged with said flats and held by said flats against relative rotation with respect to the screw portion about the axis of the screw portion while permitting relative movement in an axial direction, means for producing relative rotation between said screw and nut portions to drive one of said portions longitudinally with respect to the other, said rotation controlling means including endless keying ball raceways facing said flats, balls rotatably disposed in said keying ball raceways, and means for retaining said balls within said raceways.

6. A translational drive mechanism comprising recirculating ball-type screw and nut portions, said screw and nut portions having opposed coacting concave helical thread-defining raceways thereupon, a recirculating ball set comprising balls bridging the space between and projecting into both of said opposed raceways to journal the screw and nut portions while transmitting force axially therebetween, the screw portion having peak peripheral parts between convolutions of its helical raceway and lying on a cylindrical surface, said screw portion also having a pair of longitudinally extending flats thereon intersecting said cylindrical surface and extending to a depth which does not exceed the depth of the raceway of the screw portion, rotation controlling means engaged with said flats and held by said flats against relative rotation with respect to the screw portion about the axis of the screw portion while permitting relative movement in an axial direction, means for producing relative rotation between said screw and nut portions to drive one of said portions longitudinally relative to the other, said rotation controlling means including antifriction elements engaging said flats, and additional antifriction elements angularly spaced from said flats and engaging the peak peripheral parts of said screw portion and thereby maintaining said screw and nut portions in smoothly guided coaxial alignment with each other.

7. A translational drive mechanism comprising a housing, a ball nut member in said housing, a screw member fitted in said ball nut member, said screw and nut members having opposed coacting concave helical race portions, a recirculating ball set bridging the space between and projecting into both of said opposed race portions to journal the screw and nut members while transmitting force axially therebetween, said screw member having a flat thereon extending to a depth which does not exceed the depth of the race portion of the screw member, rotation controlling means engaging said flat to control the angular position of said screw member relative to said housing while permitting longitudinal movement of one of said members relatively to the other, and means for rotating one of said members relatively to the other to drive said screw member longitudinally.

8. A translational drive mechanism comprising a housing, a ball nut member in said housing, a screw member fitted in said ball nut member, said screw and nut members having opposed coacting concave helical race portions, a recirculating ball set bridging the space between and projecting into both of said opposed race portions to journal the screw and nut members while transmitting force axially therebetween, said screw member having a flat thereon extending to a depth which does not exceed the depth of the race portion of the screw member, rotation controlling means including an apertured member longitudinally slidable with relation to said screw member and fittingly engaging said screw member upon said flat, and means for rotating one of said members relatively to the other.

9. A supporting arrangement for a screw shaft of the type having an exposed surface extending generally parallel to the longitudinal screw axis, said supporting arrangement comprising a base support defining a ball raceway having an open portion facing the screw, and a plurality of balls rotatably disposed in said raceway and projecting partly out of said open portion for engaging a surface of the screw that extends parallel to the longitudinal screw axis.

10. A supporting arrangement for a screw shaft of the type having an exposed surface extending generally parallel to the longitudinal screw axis, said supporting arrangement comprising a base support defining a ball raceway having an open portion facing the screw, a plurality of balls rotatably disposed in said raceway and projecting partly out of said open portion for engaging a surface of the screw that extends parallel to the longitudinal screw axis, and retaining means for securing said balls in said open raceway portion.

11. A screw shaft rotational drive arrangement comprising a screw shaft having at least one flat extending parallel to the longitudinal screw axis, a member fitted around said screw and longitudinally movable relative thereto, and rotatable antifriction elements carried by said member for engaging said flat thereby holding said screw and said member against rotation relative to each other and minimizing frictional resistance to relative translational movement therebetween.

12. A screw shaft rotational drive arrangement comprising a screw shaft having at least one flat extending parallel to the longitudinal screw axis, a member fitted around said screw and movable longitudinally relative thereto, a continuous ball raceway carried by said member and including two juxtaposed portions arranged in a plane parallel to said flat and on opposite respective sides of the center line of said flat, said portions each having an open side facing said flat, and a plurality of balls disposed in said raceway for contacting said flat and thereby securing said screw and said member against relative rotation, the contact pressure on the balls in one of said juxtaposed raceway portions being relieved by a torque applied between said screw and said member so that said balls are then free to circulate unidirectionally around said raceway in response to relative translational movement between said screw and said member.

13. In combination with an axially movable screwshaft of generally cylindrical form having thread-defining portions extending in a plurality of convolutions therearound and including peak portions of maximum height between such convolutions and lying upon a concentric cylindrical surface, a plurality of supporting and guiding antifriction elements arranged longitudinally along the exterior of said screwshaft and so spaced that certain thereof simultaneously engage a plurality of such peak portions at all times.

14. In combination with an axially movable screwshaft of generally cylindrical form having thread-defining portions extending in a plurality of convolutions therearound and including peak portions of maximum height between such convolutions and lying upon a concentric cylindrical surface, said screwshaft also having a longitudinally extending flat thereon intersecting said cylindrical surface, a plurality of supporting and guiding antifriction elements arranged longitudinally along the exterior of said screwshaft in positions angularly spaced from said flat and so spaced that certain thereof simultaneously engage a plurality of such peak portions at all times, and a plurality of additional antifriction elements engageable with said flat.

15. The combination defined in claim 14 wherein said screwshaft is provided with a plurality of such flats, on opposite sides thereof, said antifriction elements being arranged in at least four sets, two sets being spaced from said flats and engaging opposed areas of said peak portions, and at least an additional one of said sets being engaged with each of said flats.

16. In a translatory driving device, in combination with a housing and a screwshaft axially movable therein, said screwshaft having a threaded surface and a flat keying portion interrupting said threaded surface and extending longitudinally thereof, a plurality of keying and guiding antifriction elements, rotatably supported in the housing and engaging longitudinally spaced areas of said keying portion.

References Cited in the file of this patent

UNITED STATES PATENTS

| | | |
|---|---|---|
| 1,575,166 | Johnson et al. | Mar. 2, 1926 |
| 1,890,144 | Best | Dec. 6, 1932 |
| 1,959,728 | Mathis | May 22, 1934 |
| 2,090,330 | Jones | Aug. 17, 1937 |
| 2,166,106 | Gormley | July 18, 1939 |
| 2,298,011 | Hoffar | Oct. 6, 1942 |
| 2,368,345 | Clark | Jan. 30, 1945 |
| 2,557,689 | Repko et al. | June 19, 1951 |
| 2,578,608 | Shull | Dec. 11, 1951 |
| 2,640,365 | Michie | June 2, 1953 |
| 2,681,836 | Jarund | June 22, 1954 |
| 2,823,960 | Blazek et al. | Feb. 18, 1958 |

UNITED STATES PATENT OFFICE
CERTIFICATE OF CORRECTION

Patent No. 3,046,808                 July 31, 1962

Le Roy S. De Mart

It is hereby certified that error appears in the above numbered patent requiring correction and that the said Letters Patent should read as corrected below.

Column 5, line 2, for "longitudinal" read -- longitudinally --; line 74, strike out -- screw --.

Signed and sealed this 15th day of January 1963.

(SEAL)
Attest:

ERNEST W. SWIDER
Attesting Officer

DAVID L. LADD
Commissioner of Patents